(12) United States Patent
Seshadri et al.

(10) Patent No.: US 8,903,012 B2
(45) Date of Patent: Dec. 2, 2014

(54) CONTINUOUS PHASE MODULATION FOR SATELLITE COMMUNICATIONS

(75) Inventors: Rohit Seshadri, Gaithersburg, MD (US); Mustafa Eroz, Germantown, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 509 days.

(21) Appl. No.: 12/894,358

(22) Filed: Sep. 30, 2010

(65) Prior Publication Data

US 2011/0274216 A1    Nov. 10, 2011

Related U.S. Application Data

(60) Provisional application No. 61/331,078, filed on May 14, 2010.

(51) Int. Cl.
| | |
|---|---|
| H04L 27/00 | (2006.01) |
| H04L 25/03 | (2006.01) |
| H04L 1/00 | (2006.01) |
| H04L 27/20 | (2006.01) |

(52) U.S. Cl.
CPC ........ *H04L 27/2003* (2013.01); *H04L 25/0384* (2013.01); *H04L 1/0059* (2013.01); *H04L 25/03834* (2013.01)
USPC ........... 375/295; 329/345; 332/103; 332/112; 332/144; 340/870.18; 370/215; 398/188; 455/42; 455/205

(58) Field of Classification Search
None
See application file for complete search history.

(56) References Cited

U.S. PATENT DOCUMENTS

| | | | |
|---|---|---|---|
| 5,834,986 A | 11/1998 | Myers | |
| 6,968,021 B1 | 11/2005 | White et al. | |
| 2004/0184565 A1 | 9/2004 | Beadle et al. | |
| 2007/0211786 A1* | 9/2007 | Shattil | 375/141 |
| 2007/0274253 A1* | 11/2007 | Zhang et al. | 370/328 |
| 2008/0310484 A1* | 12/2008 | Shattil | 375/146 |
| 2010/0080312 A1* | 4/2010 | Moffatt et al. | 375/260 |
| 2012/0289835 A1* | 11/2012 | Hwang | 600/447 |

OTHER PUBLICATIONS

"P1074EP00 Extended European Search Report", EP Application No. 11164857.2, Extended ESR, Feb. 27, 2014.
Anderson, John et al., "Advances in Constant Envelope Coded Modulation", IEEE Communications Magazine, No. 12, New York, Dec. 1991.
Ho, Paul et al., "Power Spectral Density of Digital Continuous Phase Modulation with Correlated Data Symbols", IEEE Proceedings, vol. 133, Pt. F, No. 1, Feb. 1986.

* cited by examiner

*Primary Examiner* — Adolf Dsouza
(74) *Attorney, Agent, or Firm* — Potomac Technology Law, LLC

(57) ABSTRACT

A new coded continuous phase modulation (CPM) scheme is proposed to enhance physical layer performance of the current DVB-RCS standard for a satellite communication system. The proposed CPM scheme uses a phase pulse design and combination of modulation parameters to shape the power spectrum of CPM signal in order to improve resilience to adjacent channel interference (ACI). Additionally, it uses a low complexity binary convolutional codes and S-random bit interleaving. Phase response using the proposed CPM scheme is a weighted average of the conventional rectangular and raised-cosine responses and provides optimum response to minimize frame error rate for a given data rate.

32 Claims, 6 Drawing Sheets

CONTINUOUS PHASE MODULATION FOR SATELLITE COMMUNICATIONS

The present application claims priority from U.S. Provisional Application No. 61/331,078 filed May 14, 2010, the entire disclosure of which is incorporated herein by reference.

BACKGROUND

The present invention relates to satellite communication systems, non-limiting examples of which include Digital Video Broadcasting (DVB) and the physical layer performance of the current DVB-RCS (Digital Video Broadcasting-Return Channel Satellite) standard for satellite communication systems.

In multi-access wireless communication systems, for example, Frequency Division Multiple Access (FDMA) systems, multiple users share the available system resources. A problem in systems where the communication channel is shared by several users is spectral spreading, wherein one channel "bleeds over" into another channel, which is referred to as Adjacent Channel Interference (ACI). This ACI problem can cause serious performance degradation. This is because in order to achieve high bandwidth/spectral efficiencies, the frequency separation between the adjacent channels (carriers) must be reduced, causing an increase in ACI and resulting in performance degradation.

The performance of such systems can be improved through a more judicious choice of the modulation and channel (error correction) coding in the physical layer function of the system. Continuous phase modulation is a known method to modulate the data in communication systems. Continuous phase modulator (CPM) modulates the carrier phase in a continuous manner and is known to improve spectral efficiency and power efficiency of the data signal.

Operation of a transmitter and a receiver for a satellite communication system using continuous phase modulation is described below.

FIG. 1 illustrates a prior art transmitter 100 for a conventional satellite communication system.

As illustrated in FIG. 1, transmitter 100, which may transmit over a channel 112 includes a bit source 102, a binary convolutional coder 104, a S-random interleaver 106, a bit-to-symbol generator 108 and a CPM 110. In this illustration, each of bit source 102, binary convolutional coder 104, S-random interleaver 106, bit-to-symbol generator 108, CPM 110 and channel 112 are illustrated as distinct devices. However, at least two of bit source 102, binary convolutional coder 104, S-random interleaver 106, bit-to-symbol generator 108 and CPM 110 may be combined as a unitary device.

Bit source 102 is arranged to provide a data bits signal 114 to binary convolutional coder 104. Binary convolutional coder 104 is arranged to receive data bits signal 114 from bit source 102 and provide an encoded data bits 116 to S-random interleaver 106. S-random interleaver 106 is arranged to receive encoded data bits 116 from binary convolutional coder 104 and provide a scrambled data bits 118 to bit-to-symbol generator 108. Bit-to-symbol generator 108 is arranged to receive scrambled data bits 118 from S-random interleaver 106 and provide a data symbols signal 120 to CPM 110. CPM 110 is arranged to receive data symbols signal 120 from bit-to-symbol generator 108 and provide a modulated waveform signal 122 to channel 112. Channel 112 is arranged to receive modulated waveform 122 from CPM 110 and provide a channel output 124.

Bit source 102 is operable to provide data bits signal 114 to be transmitted through channel 112. Non-limiting examples for bit source 102 include data, images, video, audio, etc.

Binary convolutional coder 104 is operable to encode data bits signal 114 using a convolutional code and provides forward error correction on data bits 114. Non-limiting examples of convolutional coding include recursive and non-recursive, systematic and non-systematic convolutional codes. Purpose of forward error correction (FEC) is to improve the capacity of a channel by adding some carefully designed redundant information to the data being transmitted through the channel. Binary convolution coding is a form of channel coding to add this redundant information to the data.

S-random interleaver 106 is operable to scramble the encoded data bits 116 by rearranging the bit sequence in order to improve error rate performance and lower the error floors. Interleaving is a process of rearranging the ordering of a data sequence in a one to one deterministic format. The inverse of this process is calling deinterleaving, which restores the received sequence to its original order. Interleaving is used to enhance the error correcting capability of coding. An S-random interleaver (where S=1, 2, 3 . . . ) is a "semi-random" interleaver, which changes the order of the data sequence of incoming input symbols, and generally provides the permuted data sequence in the form of an interleaving matrix.

Bit-to-symbol generator 108 is operable to convert the scrambled data bits 118 to data symbols signal 120 in preparation for modulation. CPM 110 is operable to modulate data symbols signal 120 using a modulation scheme. Non-limiting examples of modulation schemes provided by CPM 100 include minimum shift keying (MSK) and Gaussian minimum shift keying (GMSK). Modulated data symbols signal 122 is transmitted to external entities (not shown) via channel output 124. Channel output 124 may be considered as part of the external entities.

FIG. 2 illustrates a prior art receiver 200 for a conventional satellite communication system.

As illustrated in FIG. 2, receiver 200 includes a CPM correlator bank 202, a CPM detector 204, a S-random deinterleaver 206, a binary convolutional decoder 208, and a S-random interleaver 210. In this illustration, each of CPM correlator bank 202, CPM detector 204, S-random deinterleaver 206, binary convolutional decoder 208, and S-random interleaver 210 are illustrated as distinct devices. However, at least two of CPM correlator bank 202, CPM detector 204, S-random deinterleaver 206, binary convolutional decoder 208, and S-random interleaver 210 may be combined as a unitary device.

CPM correlator bank 202 is arranged to receive channel output 212 from a transmitting source, for example, channel output 124 from transmitter 100. CPM detector 204 is arranged to receive statistical estimates of all possible transmitted CPM waveforms 214 from CPM correlator bank 202 and scrambled estimates of the probability that the transmitted codebits (i.e. bits generated by the convolutional code) are either a 1 or 0 from S-random interleaver 210 and output probability estimates of the transmitted symbols as a detected signal 216 to S-random deinterleaver 206. S-random deinterleaver 206 is arranged to receive the updated probability estimates of the transmitted symbols as detected signal 216 from CPM detector 204 and output descrambled probability estimates of the transmitted codebits as a descrambled signal 218 to binary convolutional decoder 208. Binary convolutional decoder 208 is arranged to receive descrambled signal 218 from S-random deinterleaver 206 and output a bit sequence 220 to external entities (not shown) and codebit probabilities as decoded signal 222 to S-random interleaver 210. S-random interleaver 210 is arranged to receive decoded signal 222 from binary convolutional decoder 208 and output scrambled codebit probabilities as a signal 224 to CPM detector 204.

CPM correlator bank 202 operates to receive channel output 212 from a transmitting source, for example transmitter 100. CPM correlator bank 202 may operate to correlate the received signal with N possible transmitted signals, where N is a finite integer number and depends on the specific choice of CPM modulation parameters. CPM correlator bank functions as a matched filter and provides a matrix indicating how closely related the received signal may be to each of those N possible transmitted signals. Correlated signal 214 provides a statistical indication as to which one of N possible transmitted signals may be the received signal.

CPM detector 204 is operable to use the statistics provided by correlated signal 214 to perform decoding of a received signal for providing an estimate of the received symbols. Non-limiting examples of decoding algorithms performed by CPM detector 204 includes Viterbi, BCJR, etc. CPM detector 204 may also operate to receive scrambled probabilities of the transmitted codebits being either a 1 or a 0 (i.e. bits generated by the convolutional code) as signal 224 from S-random interleaver 210 in order to provide a better estimate of the received signal.

Every interleaver has a corresponding deinterleaver, which acts on the interleaved data sequence and restores it to its original order. The de-interleaving matrix is generally the transpose of the interleaving matrix. S-random deinterleaver 206 is operable to descramble the detected signal 216 from CPM detector 204. S-random deinterleaver 206 operates to provide the descrambled signal 218 to binary convolutional decoder 208.

Binary convolutional decoder 208 may operate to use a decoding algorithm to decode using descrambled probabilities from descrambled signal 218 for providing a decoded signal 222 and bit sequence 220. Non-limiting examples of decoding algorithms include Viterbi, BCJR, etc.

S-random interleaver 210 is operable to improve the error rate performance by feeding the scrambled signal 224 back to CPM detector 204. The goal of receiver 200 is to recover the received signal such that bit sequence 220 recovered by receiver 200 matches the bit sequence provided by the transmitting source.

The first pass through CPM detector 204, S-random deinterleaver 206 and binary convolutional decoder 208 provides an estimate of bit sequence 220 which may match with the transmitted bit source. The operation of S-random interleaver 210 providing feedback to CPM detector 204 improves the signal estimate with successive iterations though the feedback loop, until recovered information matches information provided by the transmitting source or until a maximum number of iterations are performed, whichever occurs first.

The operation of a conventional transmitter, which involved encoding, scrambling and modulation of a bit source for transmission via a channel of a communication system was discussed previously with respect to FIG. 1. The operation of a conventional receiver, which involved correlating, descrambling and decoding of the received bit source from the channel to recover the original bit source, was discussed with respect to FIG. 2.

In communication systems, ACI can seriously impair performance, especially when high bandwidth efficiencies are desired. In order to achieve high bandwidth/spectral efficiencies, the frequency separation between the adjacent channels (carriers) must be reduced, causing an increase in ACI and resulting in performance degradation. A common practice to improve the performance is by applying interference cancellation at the receiver however, this entails a significant increase in the complexity.

Alternatively, the performance could also be improved using a continuous phase modulation scheme with a more judicious choice of the modulation and channel (error correction). Through the design of the CPM phase pulse and selection of the remaining modulation parameters, power spectrum of the CPM signal can be shaped to improve the resilience to ACI.

Additionally, with the continuous phase modulation schemes used by conventional CPMs, error rate performance for information flow between a transmitter and a receiver for a satellite communication system does not provide optimum results in recovering the bit source at the receiver as compared to the transmitted bit source.

What is needed is an improved CPM scheme for communication systems for increasing error rate performance of information flow. An improved CPM scheme should provide an improved resilience to adjacent channel interference and also improve error rate performance for both high and low frame error rates.

BRIEF SUMMARY

Embodiments of the present invention may operate to provide a CPM scheme exhibiting an improved resilience to adjacent channel interference and also provide an improved error rate performance at both high and low frame error rates using low complexity binary convolutional codes and S-random bit interleaving, and in particular may operate to enhance the physical layer performance of the current DVB-RCS standard for a satellite communication system or any satellite communications system in general.

In accordance with an aspect of the present invention, a device for use with a bit source, which can provide a source data stream. The device includes a bit-to-symbol generator and a continuous phase modulator. The bit-to-symbol generator can output a symbol stream of a plurality of different types of symbols, wherein the symbol stream is based on the source data stream. The continuous phase modulator can output a modulated signal based on the symbol stream. The modulated signal is based on an alphabet size of the plurality of different types of symbols, a modulation index h, a pulse shape and a pulse width: wherein $q_{av}$ is a continuous phase modulation phase response of a pulse shape for the modulator as a function of time; wherein $q_{rc}$ is a continuous phase modulation phase response of raised-cosine-shaped pulses as a function of time; wherein $q_{re}$ is a continuous phase modulation phase response of rectangular-shaped pulses as a function of time, and wherein $q_{av}$ is a linear function of $q_{rc}$ and $q_{re}$.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Embodiments of the present invention may operate to provide a coded CPM scheme for a wireless communication system as described below. Through the design of the CPM phase pulse and selection of the remaining modulation parameters, the power spectrum can be shaped to improve the resilience with respect to ACI. Additionally, the coded CPM scheme may operate to enhance the physical layer performance of the current DVB-RCS standard for satellite communication systems by improving error rate performance for both high and low frame error rates using low-complexity binary convolutional codes and S-random bit interleaving.

Figure 3:
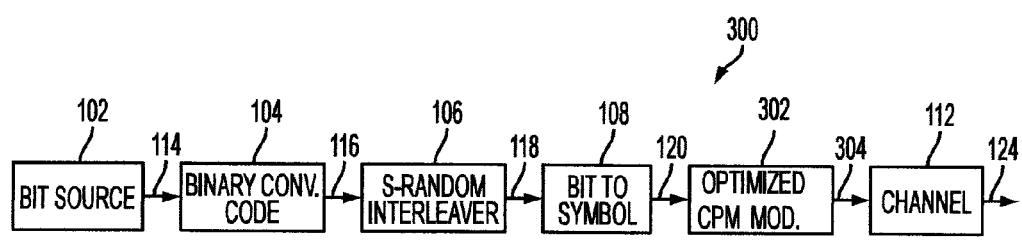
FIG. 3 illustrates an example transmitter, in accordance with aspects of the present invention.

FIG. 3 illustrates an example transmitter 300, in accordance with an aspect of the present invention.

Figure 1:
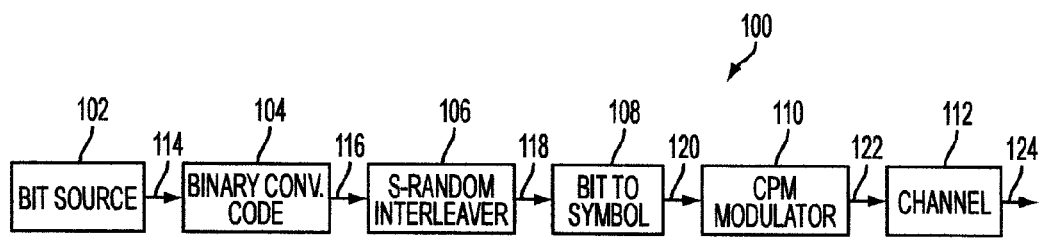
FIG. 1 illustrates a prior art transmitter for a conventional satellite communication system.

Transmitter 300 includes some elements of transmitter 100 of FIG. 1, mainly, bit source 102, binary convolutional coder 104, S-random interleaver 106, bit-to-symbol generator 108 and channel 112. In place of CPM 110 of transmitter 100, transmitter 300 includes a CPM 302.

As illustrated in FIG. 3, each of bit source 102, binary convolutional coder 104, S-random interleaver 106, bit-to-symbol generator 108, CPM 302 and channel 112 are illustrated as distinct devices. However, at least two of bit source 102, binary convolutional coder 104, S-random interleaver 106, bit-to-symbol generator 108 and CPM 302 may be combined as a unitary device.

Bit-to-symbol generator 108 is arranged to receive scrambled data bits 118 from S-random interleaver 106 and provide data symbols signal 120 to CPM 302. CPM 302 is arranged to receive data symbols signal 120 from bit-to-symbol generator 108 and provide a modulated data symbols signal 304 to channel 112. Channel 112 is arranged to receive modulated data symbols signal 304 from CPM 302 and provide channel output 124.

Bit source 102, binary convolutional coder 104, S-random interleaver 106, bit-to-symbol generator 108 and channel 112 operate as described previously for transmitter 100 with reference to FIG. 1. CPM 302 may operate in accordance with modulator code parameters as described in more detail in the following discussion.

Operation of transmitter 300 will be explained below in detail for a vector of information bits u, provided as data bits signal 114 from bit source 102:

$$u = [u_0, u_1, \ldots, u_{N_u}-1] \in \{0,1\},$$

which may be encoded by binary convolutional coder 104 to produce encoded data bits 116 with codeword $$b' = [b'_0, b'_1, \ldots, b'_{N_b-1}] \in \{0,1\}.$$

The code rate for binary convolutional coder 104 may be calculated as $$R_c = \frac{N_u}{N_b}.$$

Output of binary convolutional coder 104 may be bit interleaved by S-random interleaver 106 to produce scrambled data bits 118 as interleaved codeword $$b = [b_0, b_1, \ldots, b_{N_b-1}].$$

The interleaved codeword may be arranged in a $\log_2 M \times N_s$ matrix B with the (i, k) element given by $$B_{ik} = b_{k \log_2 M + i}.$$

Each column of B may be mapped to one of M symbols by bit-to-symbol generator 108 to produce data symbols 120 as vector $$a = [a_0, a_1, \ldots, a_{N_s-1}] \in \{0, 1, \ldots, M-1\}; N_s = \frac{N_b}{\log_2 M}.$$

A symbol sequence may be provided to CPM 302. An Alphabet with size of M=4 and a modulation influenced bit-to-symbol mapping is discussed. More specifically, when the modulation index h=m/p has p=2 or 3, following mapping scheme may be used:

| Bits | Symbol |
|---|---|
| 00 | 0 |
| 01 | 1 |
| 10 | 2 |
| 11 | 3 | else the following mapping scheme may be used:

| Bits | Symbol |
|---|---|
| 00 | 0 |
| 01 | 1 |
| 11 | 2 |
| 10 | 3 |

The modulated CPM signal 304 can be represented using one of many possible methods, such as (but not limited to) Rimoldi's decomposition approach, or in terms of Laurent pulses. For purposes of discussion, Rimoldi's decomposition approach is followed in order to represent modulated CPM signal 304. Rimoldi's decomposition approach allows describing any CPM signal with a rational modulation index using a finite-state machine with a time-invariant trellis. Channel 112 may be modeled as zero-mean Additive White Gaussian Noise (AWGN).

As described previously with respect to FIG. 3, operation of transmitter 300 was discussed using CPM 302 in accordance with aspects of the present invention. Performance of CPM 302 with proposed modulator code parameters will be described in more detail below with reference to FIGS. 5-11.

Figure 4:
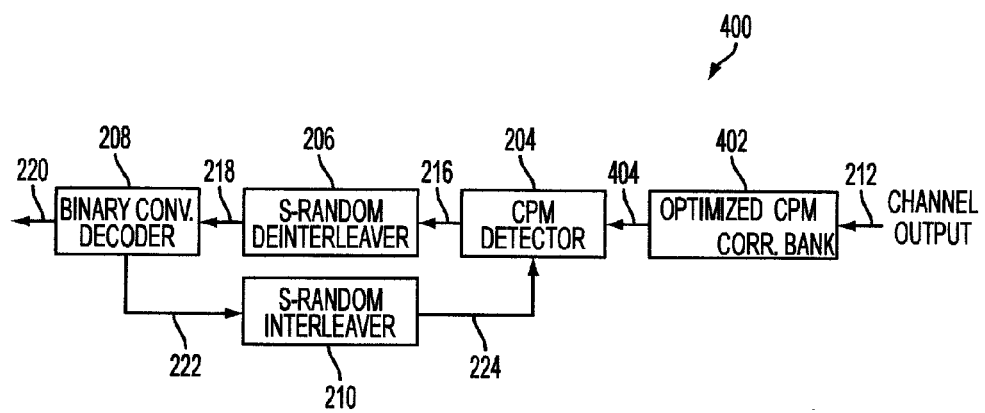
FIG. 4 illustrates an example receiver, in accordance with aspects of the present invention.

FIG. 4 illustrates an example receiver 400, in accordance with aspects of the present invention.

Figure 2:
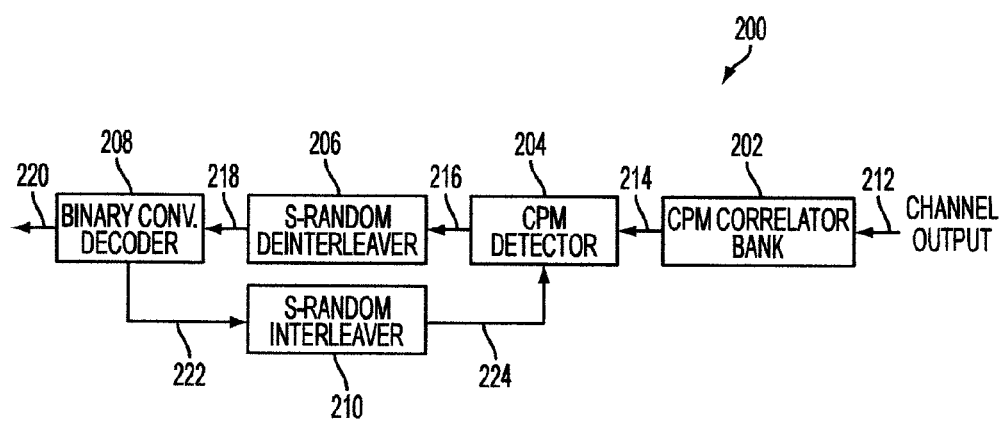
FIG. 2 illustrates a prior art receiver for a conventional satellite communication system.

Receiver 400 includes some elements of receiver 200 of FIG. 2, mainly, CPM detector 204, S-random deinterleaver 206, binary convolutional decoder 208, and S-random interleaver 210. In place of CPM correlator bank 202 of receiver 200, receiver 400 includes a CPM correlator bank 402.

As illustrated in FIG. 4, each of CPM correlator bank 402, CPM detector 204, S-random deinterleaver 206, binary convolutional decoder 208, and S-random interleaver 210 are illustrated as distinct devices. However, at least two of CPM correlator bank 402, CPM detector 204, S-random deinterleaver 206, binary convolutional decoder 208, and S-random interleaver 210 may be combined as a unitary device.

CPM correlator bank 402 is arranged to receive channel output 212 and output a correlated signal 404 to CPM detector 204.

CPM detector 204, S-random deinterleaver 206, binary convolutional decoder 208, and S-random interleaver 210 operate as described above for receiver 200 with reference to FIG. 2.

CPM detector 204 follows soft-in soft-out (SISO) methodology. CPM detector 204 generates maximum a posteriori (MAP) probabilities for the transmitted bit source by executing BCJR algorithm on the time-invariant trellis describing the modulation.

Binary convolutional decoder 208 also performs SISO detection by executing the BCJR algorithm on the trellis describing the convolutional code. For the binary convolutional decoder 208, the constraint length 3 code decodes on a 4 state trellis, whereas the constraint length 4 code requires an 8 state trellis. In order to improve the signal estimate, information is exchanged between CPM detector 204 and binary convolutional decoder 208 during successive iterations until recovered information matches information provided by the transmitting source.

The coded system performance is evaluated at the following six spectral efficiencies: 0.5 b/s/Hz, 0.75 b/s/Hz, 1.1 b/s/Hz, 1.25 b/s/Hz, 1.5 b/s/Hz and 1.8 b/s/Hz. For the analysis, it was assumed the CPM signal shares the AWGN channel with 4 interfering, equally spaced, carriers (i.e. two carriers on either side of the desired carrier). If $f_i$ and $f_j$ are the center frequencies for the $i^{th}$ and $j^{th}$ carriers, then the frequency separation between two immediate neighbors is, $$\Delta_f = |f_i - f_j|, \text{ for all, } |i-j|=1.$$

The spectral efficiency may be measured as, $$\eta = \frac{R_c \log_2 M}{\Delta_f T},$$

where T is the symbol duration.

For the analysis, it was assumed that the carriers are homogenous, i.e. they all use the same CPM modulation parameters.

As discussed previously with respect to FIG. 4, CPM 302 and CPM correlator bank 402 operate in accordance with an aspect of the present invention for providing a phase response generating an improved FER. Performance of CPM 302 and CPM correlator bank 402 in addition to proposed modulator code parameters will be described in more detail in the following discussion with reference to FIGS. 5-11.

Figure 5:
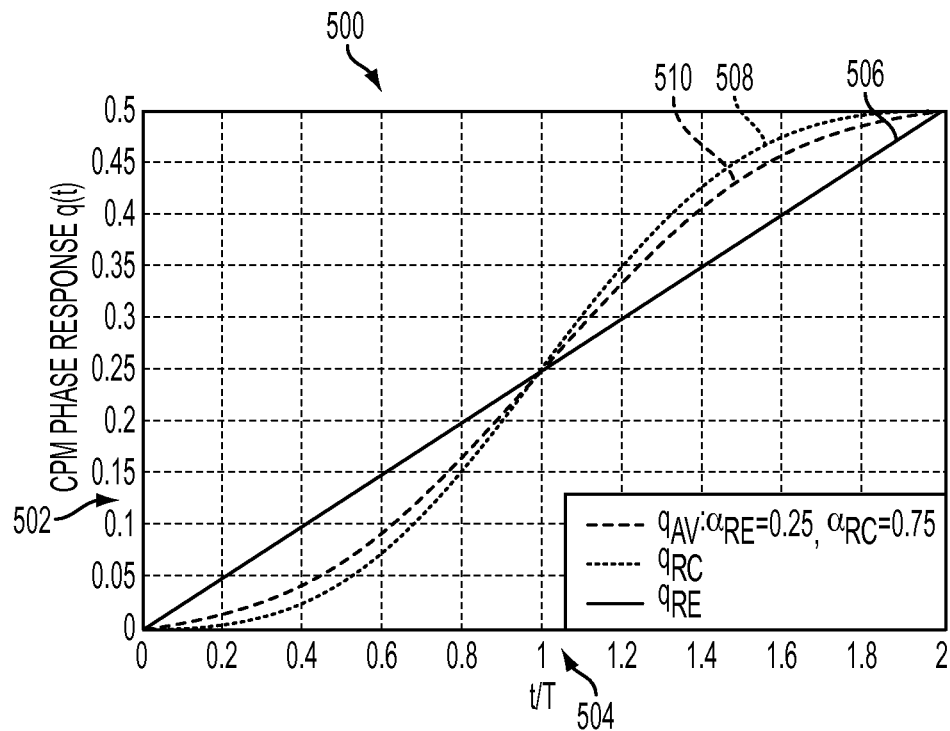
FIG. 5 illustrates a graph of CPM phase response with time, in accordance with aspects of the present invention.

FIG. 5 illustrates a graph 500 of CPM phase response with time, in accordance with aspects of the present invention.

As illustrated in the figure, an y-axis 502 represents the CPM phase response in radians and a x-axis 504 represents the time normalized by symbol duration or time multiplied by symbol rate (t/T). CPM phase response is represented by a function q(t). Graph 500 includes a curve 506 which represents the phase response for a rectangular CPM ($q_{RE}(t)$) and a curve 508 which represents the phase response for a raised-cosine CPM ($q_{RC}(t)$). Graph 500 also includes a curve 510 in accordance with an aspect of the present invention, which represents the average phase response ($q_{AV}(t)$) calculated as:

$$q_{AV}(t) = \alpha_{RE} * q_{RE}(t) + \alpha_{RC} * q_{RC}(t),$$

where $\alpha_{RE}=0.25$ and $\alpha_{RC}=0.75$ for graph 500. Values of $\alpha_{RE}$ and $\alpha_{RC}$ may be programmable in order to achieve a particular phase response.

Function q(t) shapes power spectrum density at the modulator. Each of curves 506, 508 and 510 provide a different power spectrum. Curves 506 and 508 are responses from a conventional CPM, such as CPM 110 as described with reference to FIG. 1.

Curve 506 illustrates the phase response of a CPM signal having with power spectrum having a narrow main lobe but very large spectrum side lobes. Curve 508 illustrates the phase response of a CPM signal yielding a power spectrum which has very small spectral side lobes but very large main lobe. The proposed phase response, in accordance with an aspect of the present invention, may be illustrated as curve 510, which may be represented as a weighted average of the responses of curves 506 and 508, as described previously with the function $q_{AV}(t)$. Curve 510 illustrates the phase response of a CPM signal whose spectral main lobes and side lobes can be shaped to improve resilience to ACI. CPM 302 and CPM correlator bank 402 may operate, in accordance with an aspect of the present invention, in order to provide a phase response using function $q_{AV}(t)$ resulting in an improved FER.

CPM 302 and CPM correlator bank 402 may operate in accordance with proposed modulator code parameters as described below with reference to Table 1:

TABLE 1

| b/s/Hz | Alphabet size M | Modulation index h | Pulse width | Pulse shape AV | FEC | Code Rate | $\Delta_f T$ |
|---|---|---|---|---|---|---|---|
| 0.5 | 4 | 2/5 | 2 | $\alpha_{RE}=0.02$ $\alpha_{RC}=0.98$ | $(5,7)_{octal}$ | 1/2 | 2.0 |
| 0.75 | 4 | 1/3 | 2 | $\alpha_{RE}=0.25$ $\alpha_{RC}=0.75$ | $(5,7)_{octal}$ | 1/2 | 1.333 |
| 1.1 | 4 | 2/7 | 2 | $\alpha_{RE}=0.25$ $\alpha_{RC}=0.75$ | $(5,7)_{octal}$ | 2/3 | 1.21 |
| 1.25 | 4 | 2/7 | 2 | $\alpha_{RE}=0.25$ $\alpha_{RC}=0.75$ | $(5,7)_{octal}$ | 2/3 | 1.067 |
| 1.5 | 4 | 1/4 | 2 | $\alpha_{RE}=0.25$ $\alpha_{RC}=0.75$ | $(15,17)_{octal}$ | 4/5 | 1.0667 |
| 1.8 | 4 | 1/5 | 2 | $\alpha_{RE}=0.35$ $\alpha_{RC}=0.65$ | $(15,17)_{octal}$ | 6/7 | 0.974 |

As illustrated in Table 1, column 1 displays "b/s/Hz", which indicates transmission rate as bits/sec/Hertz. Typically, as the rate of transmission increases, the amount of energy required also increases.

Column 2 displays "Alphabet size M," which indicates the maximum number of different symbols that may be transmitted. Consider for example a situation where the alphabet size is two, wherein a symbol may be transmitted on one of two positions on a circular circumference, e.g., the 12:00 position of a clock and the 6:00 position of a clock. In this example situation, suppose the transmitted symbol lies on the 12:00 position of a clock and the corresponding received symbol lies on the 2:00 position of a clock. In such a case, the receiver will likely be able to correctly determine that the transmitted symbol was on the 12:00 position of a clock. Clearly, when the alphabet size is two, the amount of data/symbol is limited to one of two, but the likelihood of determining the correctly transmitted symbol is relatively large.

Now consider the example situation where the alphabet size is 4, wherein a symbol may be transmitted on one of four positions on a circular circumference, e.g., the 12:00, the 3:00, the 6:00 and the 9:00 positions on a clock. In this example situation, suppose the transmitted symbol lies on the 12:00 position of a clock, but the received symbol lies on the 2:00 position of a clock. In such a case, the receiver may incorrectly determine that the transmitted symbol was located on the 3:00 position of a clock. Clearly, when the alphabet size is four, the amount of data/symbol is limited to one of four or twice that in the situation where the alphabet size is two, but the likelihood of determining the correctly transmitted symbol is much smaller than the situation where the alphabet size is two. Generally, as the alphabet size increases, the amount of data that can be transmitted per symbol increases and the probability of incorrectly determining a transmitted symbol also increases.

Column 3 displays "Modulation index h," wherein h is a parameter that shapes the power spectrum in CPM 302 and CPM correlator bank 402. Further, h also affects the frame error rate performance of CPM. In particular, in a single-carrier system (i.e. when there are no other carriers sharing the channel), a larger h is desirable because it results in an improved error rate performance. However, a larger h also results in the CPM signal having a wider power spectrum. Hence in the presence of adjacent carrier interference, there is a trade-off between the performance improvement from choosing a larger h and the performance degradation resulting from the increase in ACI caused by the wider power spectrum due to a large h.

Column 4 displays "Pulse width in symbol duration". In particular, the pulse width in each of the entries of Table 1 is "2," indicating the pulse width is limited to a two-symbol duration, i.e., the duration it takes to transmit two symbols.

Column 5 displays "Pulse Shape." The shape in each of the entries of Table 1 is AV, which corresponds to a linear combination of a raised-cosine pulse shape and a rectangular pulse shape, in accordance with an aspect of the present invention.

Column 6 displays forward error correction or "FEC". The $(5,7)_{octal}$ entries indicate a 4-state correction, whereas the $(15, 17)_{octal}$ entries indicate an 8 state correction.

Column 7 displays "Code Rate", which indicates redundancy in the transmitted code. For example, a code rate of 1/2 implies for every information bit entering the convolutional code, the convolutional code generated two codebits. Similarly, a code rate of 2/3 implies that for every two information bits entering the convolutional code, the convolutional code generated 3 codebits. The higher the redundancy (i.e. lower the code rate), the higher the probability that the information bit with be received without error. However, the higher the redundancy, lower the achievable spectral efficiency.

Column 7 displays "$\Delta_f T$", which indicates carrier spacing in frequency. As the carrier spacing decreases, more streams may be placed on a channel. However, as the carrier spacing decreases, ACI increases, thus increasing the probability of error for a received symbol.

Different rows in Table 1 indicate the potentially optimum combination of parameters listed in column 2 through column 7 for a particular transmission and reception rate in column 1. The proposed CPM scheme using the parameters listed in Table 1 provide improved signal to noise ratio for a given frame error rate. For example, for transmitting and receiving at a rate of 1.1 b/s/Hz, and using: an alphabet size of 4 symbols; a modulation index h of 2/7; a pulse width of 2 and pulse shape based on a AV q function in accordance with an aspect of the present invention; an FEC of $(5,7)_{octal}$; a code rate of 2/3 and a carrier spacing of 1.21 may operate to minimize transmission error and concurrently minimize transmission power. Of course any of the parameters from columns 2-7 of Table 1, within the row corresponding to a transmission rate of 1.1 may be modified. However, such a change may operate to increase the transmission error and/or increase the required transmission power needed in order to maintain the desired transmission and reception rate.

Frame error rates for code and modulation parameters in accordance with an aspect of the present invention listed in Table 1 will now described further with respect to FIGS. 6-11. For the simulation analysis, it was assumed that all interfering carriers are 3 dB stronger than the center carrier. For the simulation analysis, a maximum of 30 iterations were performed for operation with respect to the CPM detector 204 and binary convolutional decoder 208.

As shown in row 1 of Table 1, for a 0.5 b/s/Hz, alphabet size required is 4 symbols. Modulation index h is configured to 2/5. Pulse width spans 2 symbol duration and pulse shape based on an AV q function in accordance with an aspect of the present invention; FEC is $(5, 7)_{octal}$ is configured indicating a 4 state convolutional code. Code rate is configured for 1/2. $\Delta_f T$ is configured for 2.0.

Figure 6:
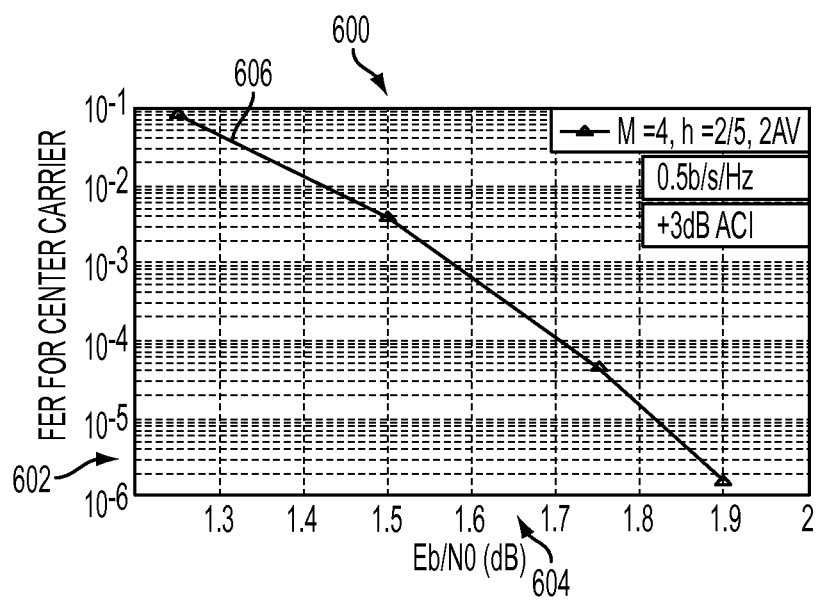
FIG. 6 illustrates a graph of frame error rate (FER) with signal to noise ratio for center carrier at 0.5 b/s/Hz, in accordance with aspects of the present invention.

FIG. 6 illustrates a graph 600 of FER with signal to noise ratio $E_b/N_0$ for center carrier at 0.5 b/s/Hz, in accordance with aspects of the present invention.

As illustrated in the figure, an y-axis 602 represents the FER for center carrier (logarithmic scale wherein the error rate does not have a unit) and a x-axis 604 represents the signal to noise ratio or energy/information bit $E_b/N_0$ (logarithmic scale in dB). Graph 600 includes a curve 606.

Graph 600 illustrates the FER performance using the rate 1/2 binary convolutional code with generators $(5,7)_{octal}$ in AWGN for the center carrier at 0.5 b/s/Hz. The length of the information sequence is $N_u=1504$ bits. The modulation parameters are configured as M=4, h=2/5 and 2 AV. The multicarrier model assumes a total of four interfering carriers with +3 dB ACI and $\Delta_f T=2.0$.

As shown in FIG. 6, curve 606 represents spectral efficiency for data rate of 0.5 b/s/Hz. Curve 606 indicates that signal to noise ratio increases with lower frame error rates. The FER performance versus signal to noise ratio $E_b/N_0$ for higher data rates will be discussed further.

As shown in row 2 of Table 1, for a 0.75 b/s/Hz rate, alphabet size required is 4 symbols. Modulation index h is configured to 1/3; a pulse width of 2 symbol duration and pulse shape based on a AV q function in accordance with an aspect of the present invention; FEC is $(5,7)_{octal}$ is configured indicating a 4 state convolutional code. Code rate is configured for 1/2. $\Delta_f T$ is configured for 1.333.

Figure 7:
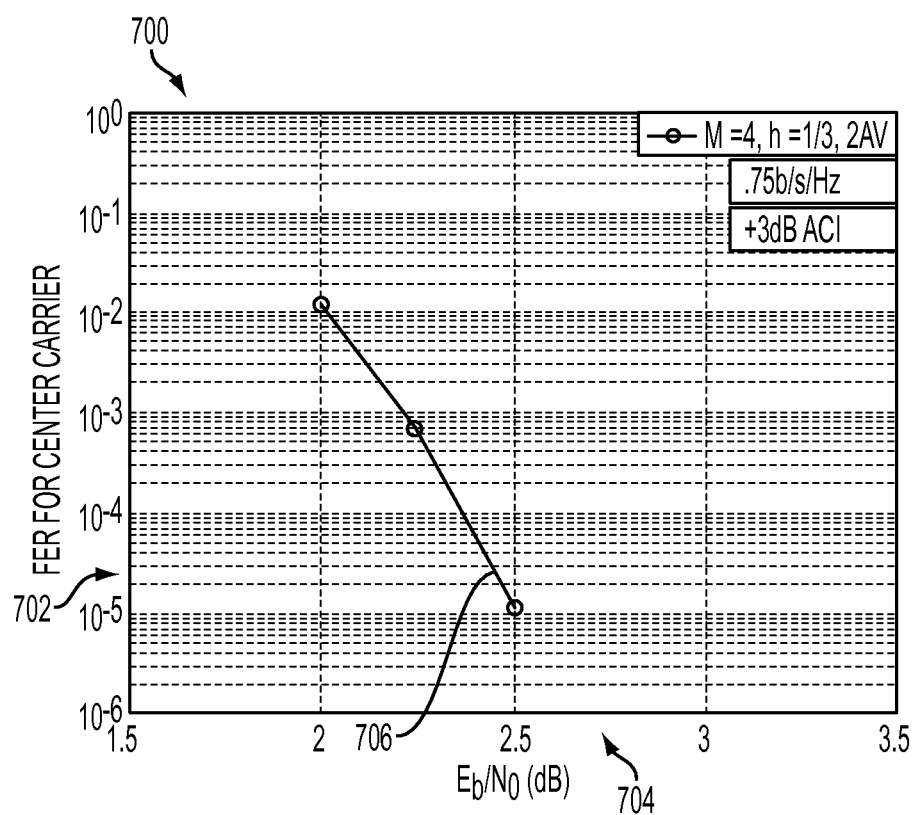
FIG. 7 illustrates a graph of frame error rate (FER) with signal to noise ratio for center carrier at 0.75 b/s/Hz, in accordance with aspects of the present invention.

FIG. 7 illustrates a graph 700 of FER with signal to noise ratio $E_b/N_0$ for center carrier at 0.75 b/s/Hz, in accordance with aspects of the present invention.

As illustrated in the figure, an y-axis 702 represents the FER for center carrier (logarithmic scale wherein the error rate does not have a unit) and a x-axis 704 represents the signal to noise ratio or energy/information bit $E_b/N_0$ (logarithmic scale in dB). Graph 700 includes a curve 706.

Graph 700 illustrates the FER performance using the rate 1/2 binary convolutional code with generators $(5,7)_{octal}$ in AWGN for the center carrier at 0.75 b/s/Hz. The length of the information sequence is $N_u$=1504 bits. The modulation parameters are configured as M=4, h=1/3 and 2 AV. The multicarrier model assumes a total of four interfering carriers with +3 dB ACI and $\Delta_f T$=1.333.

As shown in FIG. 7, curve 706 represents spectral efficiency for data rate of 0.75 b/s/Hz. Curve 706 indicates that signal to noise ratio increases with lower frame error rates. The FER performance versus signal to noise ratio $E_b/N_0$ for higher data rates will be discussed further.

As shown in row 3 of Table 1, for a 1.1 b/s/Hz rate, alphabet size required is 4 symbols. Modulation index h is configured to 2/7. A pulse width of 2 symbol duration and pulse shape based on a AV q function in accordance with an aspect of the present invention; FEC is $(5, 7)_{octal}$, is configured indicating a 4 state convolutional code. Code rate is configured for 2/3. $\Delta_f T$ is configured for 1.21. FER performance versus $E_b/N_0$ of CPM 302 using the parameters of row 2 of Table 1 is shown in FIG. 7.

Figure 8:
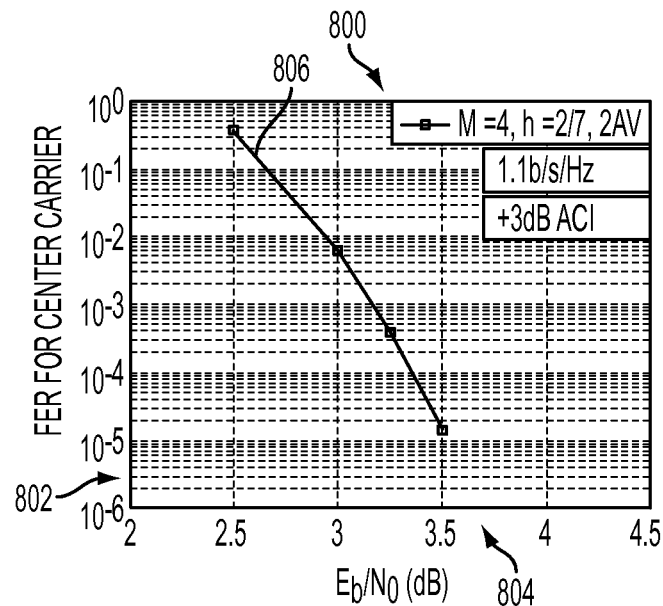
FIG. 8 illustrates a graph of frame error rate (FER) with signal to noise ratio for center carrier at 1.1 b/s/Hz, in accordance with aspects of the present invention.

FIG. 8 illustrates a graph 800 of FER with signal to noise ratio $E_b/N_0$ for center carrier at 1.1 b/s/Hz, in accordance with aspects of the present invention.

As illustrated in the figure, an y-axis 802 represents the FER for center carrier (logarithmic scale) and a x-axis 804 represents the signal to noise ratio or energy/information bit $E_b/N_0$ (logarithmic scale in dB). Graph 800 includes a curve 806.

Graph 800 shows the FER performance using the rate 2/3 binary convolutional code with generators $(5,7)_{octal}$ in AWGN for the center carrier at 1.1 b/s/Hz. The length of the information sequence is $N_u$=1504 bits. The modulation parameters are M=4, h=2/7 and 2 AV. The multicarrier model assumes a total of four interfering carriers with +3 dB ACI and $\Delta_f T$=1.21.

As shown in FIG. 8, curve 806 represents spectral efficiency for data rate of 1.1 b/s/Hz. Curve 806 indicates that signal to noise ratio increases with lower frame error rates. The FER performance versus signal to noise ratio $E_b/N_0$ for higher data rates will be discussed further.

As shown in row 4 of Table 1, for a 1.25 b/s/Hz rate, alphabet size required is 4 symbols. Modulation index h is configured to 2/7. A pulse width of 2 symbol duration and pulse shape based on a AV q function in accordance with an aspect of the present invention. FEC is $(5, 7)_{octal}$, is configured indicating a 4 state convolutional code. Code rate is configured for 2/3. $\Delta_f T$ is configured for 1.067. FER performance versus $E_b/N_0$ of CPM 302 for these parameters is shown in FIG. 9.

Figure 9:
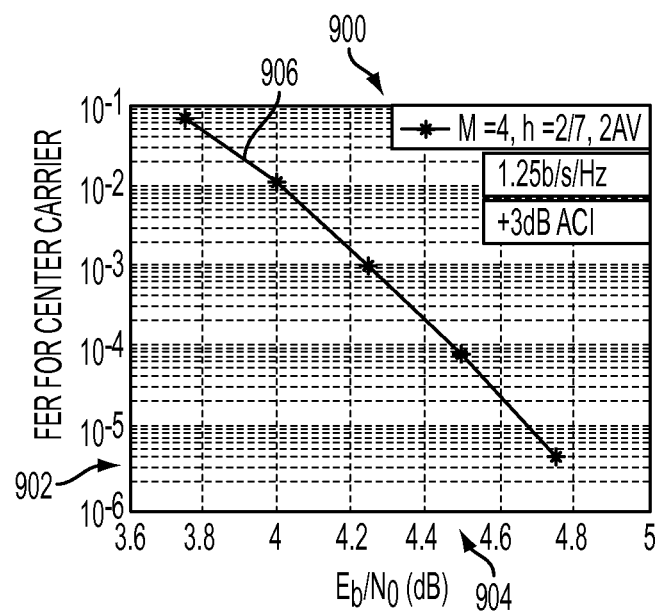
FIG. 9 illustrates a graph of frame error rate (FER) with signal to noise ratio for center carrier at 1.25 b/s/Hz, in accordance with aspects of the present invention.

FIG. 9 illustrates a graph 900 of FER with signal to noise ratio $E_b/N_0$ for center carrier at 1.25 b/s/Hz, in accordance with aspects of the present invention.

As illustrated in the figure, an y-axis 902 represents the FER for center carrier (logarithmic scale) and a x-axis 904 represents the signal to noise ratio or energy/information bit $E_b/N_0$ (logarithmic scale in dB). Graph 900 includes a curve 906.

Graph 900 shows the FER performance using the rate 2/3 binary convolutional code with generators $(5,7)_{octal}$ in AWGN for the center carrier at 1.25 b/s/Hz. The length of the information sequence is $N_u$=1504 bits. The modulation parameters are M=4, h=2/7, 2 AV. The multicarrier model assumes a total of four interfering carriers with +3 dB ACI and $\Delta_f T$=1.067.

As shown in FIG. 9, curve 906 represents spectral efficiency for data rate of 1.25 b/s/Hz. Curve 906 indicates that signal to noise ratio increases with lower frame error rates. The FER performance versus signal to noise ratio $E_b/N_0$ for even higher data rate will be discussed further.

As shown in row 5 of Table 1, for a 1.5 b/s/Hz rate, alphabet size required is 4 symbols. Modulation index h is configured to 1/4. A pulse width of 2 symbol duration and pulse shape based on an AV q function in accordance with an aspect of the present invention. FEC is $(15, 17)_{octal}$, is configured indicating a 8 state convolutional code. Code rate is configured for 4/5. $\Delta_f T$ is configured for 1.0667. FER performance versus $E_b/N_0$ of CPM 302 for these parameters is shown FIG. 10.

Figure 10:
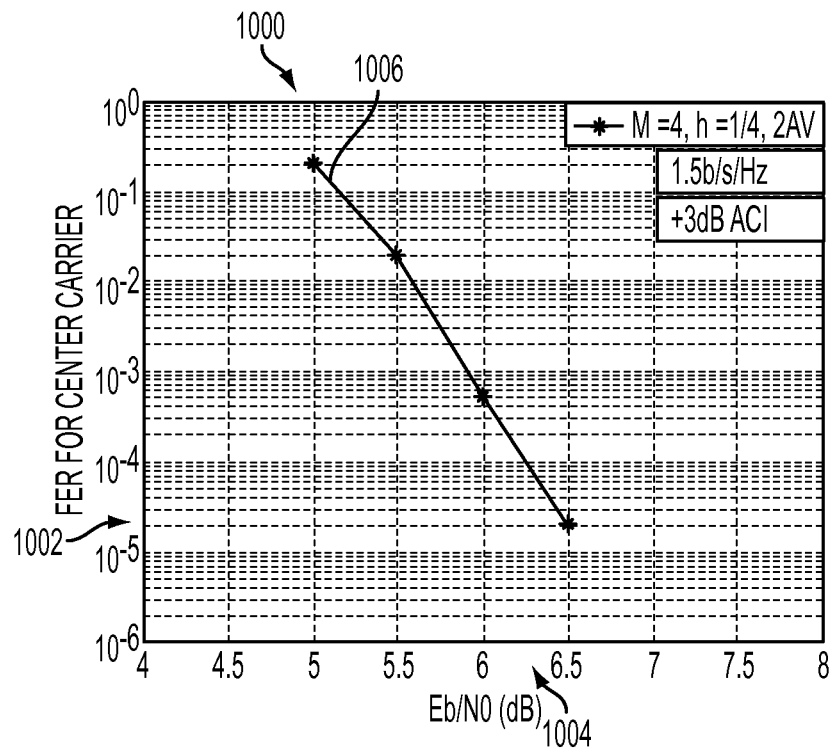
FIG. 10 illustrates a graph of frame error rate (FER) with signal to noise ratio for center carrier at 1.5 b/s/Hz, in accordance with aspects of the present invention.

FIG. 10 illustrates a graph 1000 of FER with signal to noise ratio $E_b/N_0$ for center carrier at 1.5 b/s/Hz, in accordance with aspects of the present invention.

As illustrated in the figure, an y-axis 1002 represents the FER for center carrier (logarithmic scale) and a x-axis 1004 represents the signal to noise ratio or energy/information bit $E_b/N_0$ (logarithmic scale in dB). Graph 1000 includes a curve 1006.

Graph 1000 shows the FER performance using the 4/5 binary convolutional code with generators $(15,17)_{octal}$ in AWGN for the center carrier at 1.5 b/s/Hz. The length of the information sequence is $N_u$=1504 bits. The modulation parameters are M=4, h=1/4, 2 AV. The multicarrier model assumes a total of four interfering carriers with +3 dB ACI and $\Delta_f T$=1.0667. Curve 1006 indicates that signal to noise ratio increases with lower frame error rates.

Figure 11:
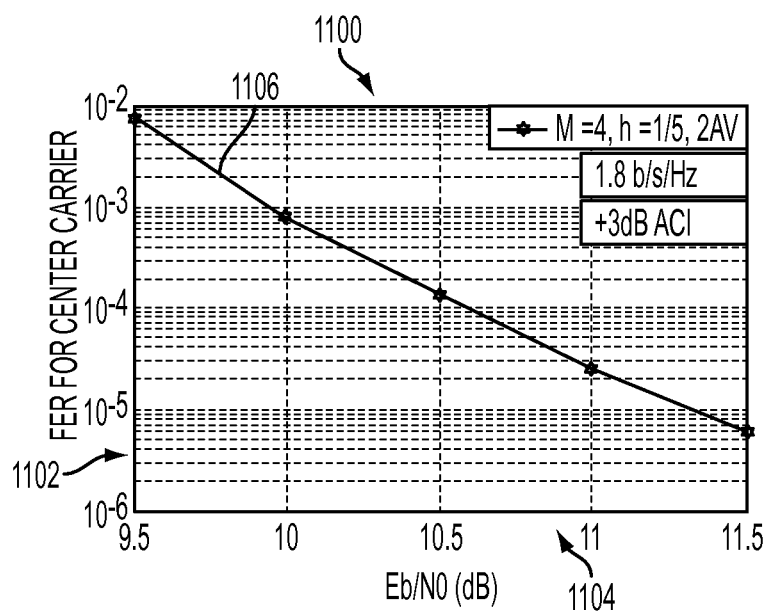
FIG. 11 illustrates a graph of frame error rate (FER) with signal to noise ratio for center carrier at 1.8 b/s/Hz, in accordance with aspects of the present invention.

FIG. 11 illustrates a graph 1100 of FER with signal to noise ratio $E_b/N_0$ for center carrier at 1.8 b/s/Hz, in accordance with aspects of the present invention.

As illustrated in the figure, an y-axis 1102 represents the FER for center carrier (logarithmic scale) and a x-axis 1104 represents the signal to noise ratio or energy/information bit $E_b/N_0$ (logarithmic scale in dB). Graph 1100 includes a curve 1106.

FIGS. 3-4 illustrate transmitter 300 and receiver 400 using proposed CPM scheme, in accordance with aspects of the present invention. As illustrated in FIG. 5, CPM phase response was calculated and was represented by function $q_{AV}$. The proposed phase response $q_{AV}$, which may be represented as a weighted average of the rectangular and raised-cosine responses, may operate to provide an optimum response for minimizing FER for a given data rate, for example, as shown in Table 1. A CPM scheme, in accordance with aspects of the present invention, using the parameters listed in Table 1 may operate to provide improved signal to noise ratio for a given frame error rate. Also, FER for center carrier was shown with respect to $E_b/N_0$ using the CPM scheme, in accordance with aspects of the present invention, at example data rates of 0.5 b/s/Hz 0.75 b/s/Hz, 1.1 b/s/Hz, 1.25 b/s/Hz and 1.5 b/s/Hz and 1.8 b/s/Hz. It should be noted that other data rates may be used in accordance with aspects of the present invention. A data rate, or spectral efficiency, may be chosen based, $$\eta = \frac{R_c \log_2 M}{\Delta_f T},$$

where $\Delta_f T$, the code rate $R_c$ and the alphabet size M are provided.

In the discussion, it was illustrated from the graphs that for a given FER, signal to noise ratio increased at higher data rates, in accordance with aspects of the present invention.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A device comprising:
   a bit-to-symbol generator operable to generate a symbol stream comprising a plurality of symbols, the symbol stream being based on a source data stream; and
   a continuous phase modulator operable to modulate the symbol stream, based on a plurality of modulator code parameters, including an alphabet size M indicating a maximum number of transmission symbols, a modulation index h, a pulse width L, a target pulse reflecting a combination of a raised-cosine pulse and a rectangular pulse, a forward error correction (FEC), a code rate R, and a symbol spacing $\Delta_f T$,
   wherein $q_{AV}$ is a continuous phase modulation phase response of the target pulse as a function of time,
   wherein $q_{RC}$ is a continuous phase modulation phase response of the raised-cosine pulse as a function of time,
   wherein $q_{RE}$ is a continuous phase modulation phase response of the rectangular pulse as a function of time, and
   wherein $q_{AV}$ comprises a weighted average combination of $q_{RC}$ and $q_{RE}$ based on respective weighting factors $\propto_{RC}$ and $\propto_{RE}$, wherein, for a given throughput (bits/sec/Hz), the weighting factor $\propto_{RC}$ is determined to optimize a width of a main lobe for $q_{RC}$ and the weighting factor $\propto_{RE}$ is determined to optimize a level of side lobes for $q_{RE}$.

2. The device of claim 1, wherein the alphabet size M is 4 symbols and the pulse width is 2, and wherein, for a throughput (in bits/sec/Hz) of 0.5, 0.75, 1.1 or 1.25, the FEC is a $(5, 7)_{octal}$ forward error correction, and, for a throughput (in bits/sec/Hz) of 1.5 or 1.8, the FEC is a $(15, 17)_{octal}$ forward error correction.

3. The device of claim 2, wherein, for the throughput (in bits/sec/Hz) of 0.5, the modulation index h is 2/5, the code rate R is 1/2, the symbol spacing $\Delta_f T$ is 2.0, and $\propto_{RE}=0.02$ and $\propto_{RC}=0.98$.

4. The device of claim 2, wherein, for the throughput (in bits/sec/Hz) of 0.75, the modulation index h is 1/3, the code rate R is 1/2, the symbol spacing $\Delta_f T$ is 1.333, and $\propto_{RE}=0.25$ and $\propto_{RC}=0.75$.

5. The device of claim 2, wherein, for the throughput (in bits/sec/Hz) of 1.1, the modulation index h is 2/7, the code rate R is 2/3, the symbol spacing $\Delta_f T$ is 1.21, and $\propto_{RE}=0.25$ and $\propto_{RC}=0.75$.

6. The device of claim 2, wherein, for the throughput (in bits/sec/Hz) of 1.25, the modulation index h is 2/7, the code rate R is 2/3, the symbol spacing $\Delta_f T$ is 1.067, and $\propto_{RE}=0.25$ and $\propto_{RC}=0.75$.

7. The device of claim 2, wherein, for the throughput (in bits/sec/Hz) of 1.5, the modulation index h is 1/4, the code rate R is 4/5, the symbol spacing $\Delta_f T$ is 1.0667, and $\partial_{RE}=0.25$ and $\partial_{RE}=0.75$.

8. The device of claim 2, wherein, for the throughput (in bits/sec/Hz) of 1.8, the modulation index h is 1/5, the code rate R is 6/7, the symbol spacing $\Delta_f T$ is 0.974, and $\propto_{RE}=0.35$ and $\propto_{RE}=0.65$.

9. A method comprising:
   generating, by way of a bit-to-symbol generator, a symbol stream comprising a plurality of symbols, the symbol stream being based on a source data stream; and
   modulating, by way of a continuous phase modulator, the symbol stream, based on a plurality of modulator code parameters, including an alphabet size M indicating a maximum number of transmission symbols, a modulation index h, a pulse width L, a target pulse reflecting a combination of a raised-cosine pulse and a rectangular pulse, a forward error correction (FEC), a code rate R, and a symbol spacing $\Delta_f T$,
   wherein $q_{AV}$ is a continuous phase modulation phase response of the target pulse as a function of time,
   wherein $q_{RC}$ is a continuous phase modulation phase response of the raised-cosine pulse as a function of time,
   wherein $q_{RE}$ is a continuous phase modulation phase response of the rectangular pulse as a function of time, and
   wherein $q_{AV}$ comprises a weighted average combination of $q_{RC}$ and $q_{RE}$ based on respective weighting factors $\propto_{RC}$ and $\propto_{RE}$, wherein, for a given throughput (bits/sec/Hz), the weighting factor $\propto_{RC}$ is determined to optimize a width of a main lobe for $q_{RC}$ and the weighting factor $\propto_{RE}$ is determined to optimize a level of side lobes for $q_{RE}$.

10. The method of claim 9, wherein the alphabet size M is 4 symbols and the pulse width is 2, and wherein, for a throughput (in bits/sec/Hz) of 0.5, 0.75, 1.1 or 1.25, the FEC is a $(5, 7)_{octal}$ forward error correction, and, for a throughput (in bits/sec/Hz) of 1.5 or 1.8, the FEC is a $(15, 17)_{octal}$ forward error correction.

11. The method of claim 10, wherein, for the throughput (in bits/sec/Hz) of 0.5, the modulation index h is 2/5, the code rate R is 1/2, the symbol spacing $\Delta_f T$ is 2.0, and $\propto_{RE}=0.02$ and $\propto_{RE}=0.98$.

12. The method of claim 10, wherein, for the throughput (in bits/sec/Hz) of 0.75, the modulation index h is 1/3, the code rate R is 1/2, the symbol spacing $\Delta_f T$ is 1.333, and $\propto_{RE}=0.25$ and $\propto_{RE}=0.75$.

13. The method of claim 10, wherein, for the throughput (in bits/sec/Hz) of 1.1, the modulation index h is 2/7, the code rate R is 2/3, the symbol spacing $\Delta_f T$ is 1.21, and $\propto_{RE}=0.25$ and $\propto_{RE}=0.75$.

14. The method of claim 10, wherein, for the throughput (in bits/sec/Hz) of 1.25, the modulation index h is 2/7, the code rate R is 2/3, the symbol spacing $\Delta_f T$ is 1.067, and $\propto_{RE}=0.25$ and $\propto_{RE}=0.75$.

15. The method of claim 10, wherein, for the throughput (in bits/sec/Hz) of 1.5, the modulation index h is 1/4, the code rate R is 4/5, the symbol spacing $\Delta_f T$ is 1.0667, and $\alpha_{RE}=0.25$ and $\alpha_{RE}=0.75$.

16. The method of claim 10, wherein, for the throughput (in bits/sec/Hz) of 1.8, the modulation index h is 1/5, the code rate R is 6/7, the symbol spacing $\Delta_f T$ is 0.974, and $\alpha_{RE}=0.35$ and $\alpha_{RE}=0.65$.

17. A device comprising:
a receiver operable to receive a modulated signal;
a demodulator operable to demodulate the modulated signal and generate a demodulated signal, and to generate a symbol stream comprising a plurality of symbols based on the demodulated signal,
wherein a modulation scheme reflected by the modulated signal is based on a plurality of modulator code parameters, including an alphabet size M indicating a maximum number of transmission symbols, a modulation index h, a pulse width L, a target pulse reflecting a combination of a raised-cosine pulse and a rectangular pulse, a forward error correction (FEC), a code rate R, and a symbol spacing $\Delta_f T$,
wherein $q_{AV}$ is a continuous phase modulation phase response of the target pulse as a function of time,
wherein $q_{RC}$ is a continuous phase modulation phase response of the raised-cosine pulse as a function of time,
wherein $q_{RE}$ is a continuous phase modulation phase response of the rectangular pulse as a function of time, and
wherein $q_{AV}$ comprises a weighted average combination of $q_{RC}$ and $q_{RE}$ based on respective weighting factors $\alpha_{RC}$ and $\alpha_{RE}$, wherein, for a given throughput (bits/sec/Hz), the weighting factor $\alpha_{RC}$ is determined to optimize a width of a main lobe for $q_{RC}$ and the weighting factor $\alpha_{RE}$ is determined to optimize a level of side lobes for $q_{RE}$.

18. The device of claim 17, wherein the alphabet size M is 4 symbols and the pulse width is 2, and wherein, for a throughput (in bits/sec/Hz) of 0.5, 0.75, 1.1 or 1.25, the FEC is a $(5,7)_{octal}$ forward error correction, and for a throughput (in bits/sec/Hz) of 1.5 or 1.8 the FEC is a $(15,17)_{octal}$ forward error correction.

19. The device of claim 18, wherein, for the throughput (in bits/sec/Hz) of 0.5, the modulation index h is 2/5, the code rate R is 1/2, the symbol spacing $\Delta_f T$ is 2.0, and $\alpha_{RE}=0.02$ and $\alpha_{RE}=0.98$.

20. The device of claim 18, wherein, for the throughput (in bits/sec/Hz) of 0.75, the modulation index h is 1/3, the code rate R is 1/2, the symbol spacing $\Delta_f T$ is 1.333, and $\alpha_{RE}=0.25$ and $\alpha_{RE}=0.75$.

21. The device of claim 18, wherein, for the throughput (in bits/sec/Hz) of 1.1, the modulation index h is 2/7, the code rate R is 2/3, the symbol spacing $\Delta_f T$ is 1.21, and $\alpha_{RE}=0.25$ and $\alpha_{RE}=0.75$.

22. The device of claim 18, wherein, for the throughput (in bits/sec/Hz) of 1.25, the modulation index h is 2/7, the code rate R is 2/3, the symbol spacing $\Delta_f T$ is 1.067, and $\alpha_{RE}=0.25$ and $\alpha_{RE}=0.75$.

23. The device of claim 18, wherein, for the throughput (in bits/sec/Hz) of 1.5, the modulation index h is 1/4, the code rate R is 4/5, the symbol spacing $\Delta_f T$ is 1.0667, and $\alpha_{RE}=0.25$ and $\alpha_{RE}=0.75$.

24. The device of claim 18, wherein, for the throughput (in bits/sec/Hz) of 1.8, the modulation index h is 1/5, the code rate R is 6/7, the symbol spacing $\Delta_f T$ is 0.974, and $\alpha_{RE}=0.35$ and $\alpha_{RE}=0.65$.

25. A method comprising:
receiving a modulated signal;
demodulating by way of a demodulator, the modulated signal and generating a demodulated signal; and
generating a symbol stream comprising a plurality of symbols, the symbol stream being based on the demodulated signal,
wherein a modulation scheme reflected by the modulated signal is based on a plurality of modulator code parameters, including an alphabet size M indicating a maximum number of transmission symbols, a modulation index h, a pulse width L, a target pulse reflecting a combination of a raised-cosine pulse and a rectangular pulse, a forward error correction (FEC), a code rate R, and a symbol spacing $\Delta_f T$,
wherein $q_{AV}$ is a continuous phase modulation phase response of the target pulse as a function of time,
wherein $q_{RC}$ is a continuous phase modulation phase response of the raised-cosine pulse as a function of time,
wherein $q_{RE}$ is a continuous phase modulation phase response of the rectangular pulse as a function of time, and
wherein $q_{AV}$ comprises a weighted average combination of $q_{RC}$ and $q_{RE}$ based on respective weighting factors $\alpha_{RC}$ and $\alpha_{RE}$, wherein, for a given throughput (bits/sec/Hz), the weighting factor $\alpha_{RC}$ is determined to optimize a width of a main lobe for $q_{RC}$ and the weighting factor $\alpha_{RE}$ is determined to optimize a level of side lobes for $q_{RE}$.

26. The method of claim 25, wherein the alphabet size M is 4 symbols and the pulse width is 2, and wherein, for a throughput (in bits/sec/Hz) of 0.5, 0.75, 1.1 or 1.25, the FEC is a $(5,7)_{octal}$ forward error correction, and for a throughput (in bits/sec/Hz) of 1.5 or 1.8 the FEC is a $(15,17)_{octal}$ forward error correction.

27. The method of claim 26, wherein, for the throughput (in bits/sec/Hz) of 0.5, the modulation index h is 2/5, the code rate R is 1/2, the symbol spacing $\Delta_f T$ is 2.0, and $\alpha_{RE}=0.02$ and $\alpha_{RC}=0.98$.

28. The method of claim 26, wherein, for the throughput (in bits/sec/Hz) of 0.75, the modulation index h is 1/3, the code rate R is 1/2, the symbol spacing $\Delta_f T$ is 1.333, and $\alpha_{RE}=0.25$ and $\alpha_{RC}=0.75$.

29. The method of claim 26, wherein, for the throughput (in bits/sec/Hz) of 1.1, the modulation index h is 2/7, the code rate R is 2/3, the symbol spacing $\Delta_f T$ is 1.21, and $\alpha_{RE}=0.25$ and $\alpha_{RC}=0.75$.

30. The method of claim 26, wherein, for the throughput (in bits/sec/Hz) of 1.25, the modulation index h is 2/7, the code rate R is 2/3, the symbol spacing $\Delta_f T$ is 1.067, and $\alpha_{RE}=0.25$ and $\alpha_{RC}=0.75$.

31. The method of claim 26, wherein, for the throughput (in bits/sec/Hz) of 1.5, the modulation index h is 1/4, the code rate R is 4/5, the symbol spacing $\Delta_f T$ is 1.0667, and $\alpha_{RE}=0.25$ and $\alpha_{RC}=0.75$.

32. The method of claim 26, wherein, for the throughput (in bits/sec/Hz) of 1.8, the modulation index h is 1/5, the code rate R is 6/7, the symbol spacing $\Delta_f T$ is 0.974, and $\alpha_{RE}=0.35$ and $\alpha_{RC}=0.65$.

\* \* \* \* \*